Jan. 24, 1950 C. E. DOLBERG 2,495,511

TWIN-T NETWORK AND SELECTIVE AMPLIFIER FILTER

Filed Oct. 31, 1944 3 Sheets-Sheet 1

INVENTOR
CHARLES E. DOLBERG
BY
Samuel Ostrolenk
ATTORNEY

Jan. 24, 1950 C. E. DOLBERG 2,495,511

TWIN-T NETWORK AND SELECTIVE AMPLIFIER FILTER

Filed Oct. 31, 1944 3 Sheets-Sheet 2

INVENTOR
CHARLES E. DOLBERG
BY Samuel Ostrolenk
ATTORNEY

INVENTOR
CHARLES E. DOLBERG
BY Samuel Ostrolenk
ATTORNEY

Patented Jan. 24, 1950

2,495,511

UNITED STATES PATENT OFFICE 2,495,511

TWIN-T NETWORK AND SELECTIVE AMPLIFIER FILTER

Charles E. Dolberg, Philadelphia, Pa., assignor, by mesne assignments, to Philco Corporation, Philadelphia, Pa., a corporation of Pennsylvania Application October 31, 1944, Serial No. 561,290

8 Claims. (Cl. 178—44)

My invention relates to electric wave filters in which it is desirable to separate certain frequencies, rejecting some and passing others.

More particularly, it relates to a system of wave filters in which one frequency is passed well and another frequency or frequencies close to this first one are rejected completely. This filter system is composed of resistors and capacitors and feedback amplifier tube only, and thus is especially suited to use in the audio frequency spectrum in which region it has been customary in the past to use heavy inductance coils in combination with condensers as filters.

This invention broadly provides a means of obtaining a very narrow band pass filter with the addition of a very high degree of attenuation of near-by unwanted frequencies.

In the electrical communication art, it becomes desirable quite often to pass a narrow band of frequencies and to reject frequencies outside of this band. Multiplexing or the use of a single pair of transmitting wires to carry several different signals, such as conversation or telegraph channels at the same time, is based entirely on the ability of the communication engineer to build filters which will separate one band from another. Likewise, in some measurement procedures at audio frequencies, it becomes highly desirable to pass one frequency and reject another one close to it. For example, in the use of impedance bridges at frequencies near 60 cycles such as, for example, 55 cycles, it becomes highly desirable to use a detector which will not respond to 60 cycles, but which will respond strongly to 55 cycles. Such a characteristic has been very difficult to obtain with procedures which were used prior to this invention.

Originally attempts were made to separate two close frequencies by the use of networks composed of inductance and capacitance. These were quite successful at higher frequencies, but in the audio frequency range it was found that although theoretically such network should be useable, the losses in the coil primarily due to resistance of the wire of the coil or due to loss in the iron of the core caused too little discrimination between the frequency which was desired and the frequency which was not desired, if these two frequencies were close together. As the art of electric wave filters progressed, it became possible to build filters which would give complete rejection of a specific frequency, even in the audio range. These networks however, involve rather bulky inductance coils and it becomes desirable to obtain a method of filtering out an unwanted frequency near the frequency which is desired through the use of networks which are physically light in weight. This invention describes a method for doing this with networks composed of capacitance and resistance and feedback amplifier tube.

Basically, my invention is a unique combination of vacuum tube amplifiers and twin-T circuits of the nature of the circuits described by Mr. W. N. Tuttle in the Proceedings of the Institute of Radio Engineers for January 1940, and by Mr. H. H. Scott in the February 1938 issue of the same publication. Tuttle describes the use of a twin-T network as a device for measuring components at radio frequency, but his circuit analysis is general and the network can be used to provide a null reading at any specified frequency. The manner in which the output of such a twin-T network varies with frequency is subject to calculation along lines which are of fairly standard procedure in the communication engineering art. Scott uses exactly the same network as a degenerative feedback network in an amplifying arrangement so that at the frequency at which the twin-T does not provide any transmission, there is no degenerative feed-back, and thus at this frequency, maximum gain is attained. At other frequencies, there will be degenerative feed-back, and so the overall gain of the amplifier will be reduced.

As frequency separating networks, neither the twin-T network nor the Scott amplifier are too satisfactory. The twin-T network completely rejects one frequency, but it does not strongly pass any neighboring frequency. Thus it is not satisfactory as a network for the purpose of accepting one frequency and rejecting another adjoining frequency.

The Scott amplifier will give preference to one frequency, but it will not reject completely an adjoining frequency. Thus the Scott amplifier is not satisfactory as a means for separating two closely spaced frequencies.

My invention constitutes a combination of two systems: (1) a twin-T network, the purpose of which is to completely eliminate the unwanted frequency, and (2) a Scott amplifier using a twin-T network as the feedback circuit in order to provide an amplifier which will selectively amplify the frequency which is desired. The overall combination, then, will accept the desired frequency with maximum gain and will reject substantially all of the unwanted frequency if the circuit is in accurate adjustment.

In another form of my invention it is possible to place two twin-T networks in the system in such a way that two frequencies are substantially eliminated. Normally these two frequencies would be symmetrically placed one on each side of the frequency which is to be amplified. Such a system then would be a band pass filter with points of infinite attenuation close on each side of the band which is passed.

It is a principal object of this invention then to provide a method for separating two audio frequencies, one of which is to be accepted and one of which is to be rejected.

Another object of this invention is to provide a means for separating two frequencies in the audio spectrum which are close together through the use of two of the networks which have been discussed above.

A further object of the invention is to provide a band pass filter with two points of infinite attenuation, one on each side of the band to be passed.

These and other objects and features of the invention will be apparent from the following description and the accompanying drawings in which.

Figure 1:
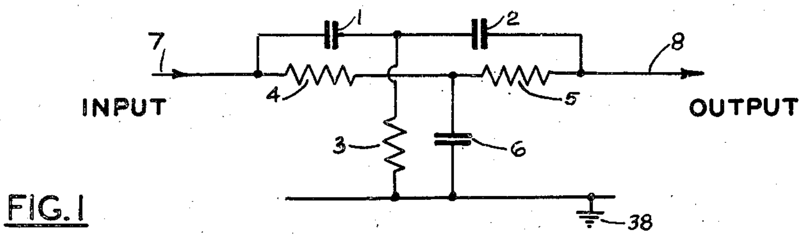
Figure 1 is the twin-T network mentioned above.

One form of the twin-T circuit as discussed by Tuttle and others is shown in Figure 1. It comprises two T circuits. One of these T's is composed of two capacitors 1 and 2 and a resistor in the vertical arm 3. The other T circuit is composed of two resistors 4 and 5 and a capacitor 6. These two circuits are connected in parallel. The electrical property of such circuits is such that with a signal applied between the input 7 and ground 38, the ratio between the output voltage appearing between terminal 8 and ground 38 and the input, is given by a curve such as that shown in Figure 4. This plot shows that output over input ratio starts at unity at zero frequency, gradually drops off to zero at a frequency $f_1$ and then rises as the frequency is increased until at a high frequency it is again back to unity. Thus there is one particular frequency at which such a circuit, if properly adjusted, will give no output whatsoever regardless of the input.

Figure 2:
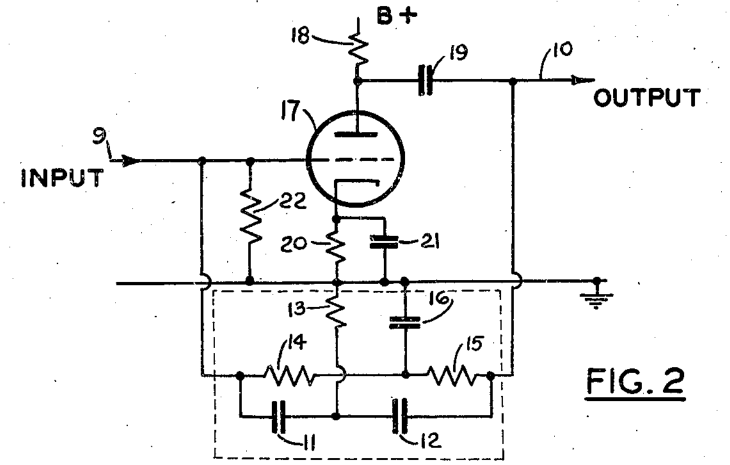
Figure 2 shows the use of the twin-T network in a feed-back amplifier as described by Scott.
Figure 5:
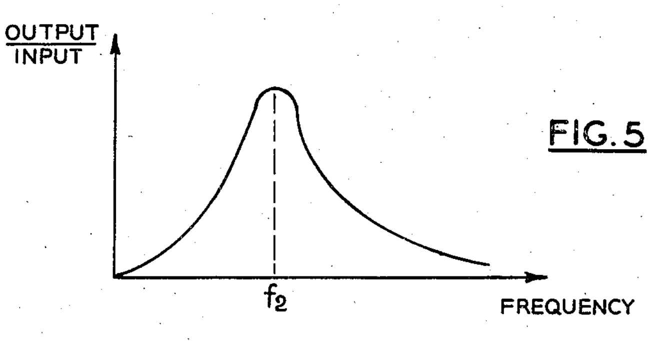
Figure 5 shows the frequency characteristic of the circuit of Figure 2.

The basic circuit of the Scott amplifier employing such a twin-T circuit for de-generative purposes is as shown in Figure 2. Here the amplifying tube 17 is fed from the plate supply through the plate resistor 18. Cathode bias is obtained in the usual manner through a cathode bias resistor 20 and capacitor 21. Grid leak resistor 22 provides proper D. C. polarity to the grid connections. The output is taken from terminal 10. and the D. C. in the plate circuit is blocked off from the output through capacitor 19. From this output terminal there is connected the input terminal of a double T circuit composed of resistors 13, 14 and 15 and capacitors 11, 12 and 16. The output of this twin-T network is coupled directly into the input 9. Such an amplifier circuit has a characteristic as a function of frequency shown by the curve in Figure 5. This indicates that as the frequency is raised from zero, the output voltage gradually increases and finally reaches a maximum at a frequency $f_2$ which is the frequency to which the twin-T network is adjusted so that it does not feed back anything from the output to the input. As the frequency is raised above this frequency, the output signal drops off again.

Figure 3:
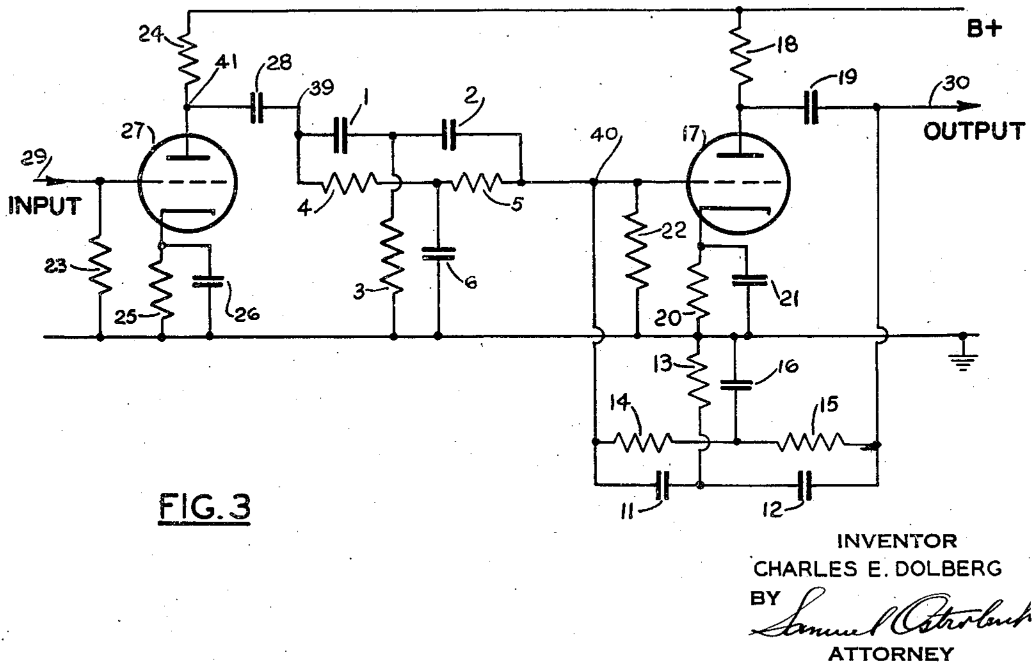
Fig. 3 shows the elemental form of my invention in which the circuits of Figure 1 and Figure 2 are combined.

The present invention effects a novel result by the novel combination of these two circuits into the circuit shown in Figure 3. Here, the input signal on line 29 is fed into a buffer amplifier tube 27. This amplifier tube employs the usual cathode bias resistor 25 with by-pass condenser 26 and plate resistor 24. The output from this amplifying stage is fed through the blocking condenser 28 into the twin-T network shown in Figure 1. The output of this twin-T network is then fed into an amplifier such as shown in Figure 2. This amplifier employs tube 17 with its associated circuits as discussed in connection with Figure 2. The output of this circuit extends over line 30. The overall characteristic of this system can be best described in terms of the signal at successive points through the system.

Figure 4:
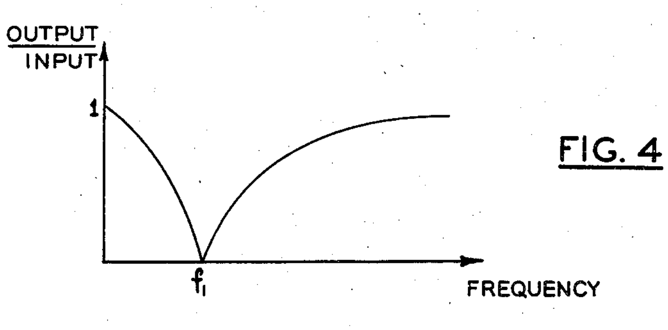
Figure 4 shows the frequency characteristic of the circuit of Figure 1.

Assuming that the signal at the input 29 contains all frequencies equally strong; then the signal at position 39 will contain all frequencies equally strong, provided that the capacitor 28 acts as a perfect by-pass capacitor and provided that the input impedance to the twin-T circuit is high compared to the plate resistor 24. If this is true, then the signal at point 40 will have a characteristic such as is shown by Figure 4. That is, it will have substantially the characteristic of the circuit of Figure 1. There will be one difference however in this characteristic since at zero frequency capacitor 28 cannot possibly act as a perfect by-pass condenser. Thus, the signal at point 40 will be zero at zero frequency. As the frequency is increased, it will quickly rise to the same value that the signal has at point 41, which value is given by the amplification of the buffer amplifier circuit of the tube 27.

As the frequency is raised, the signal at the point 40 will decrease in accordance with the curve of Figure 4, and when frequency $f_1$ is reached, there will be no signal at point 40. If the frequency is extended above this frequency, the signal will gradually rise again until it reaches substantially the same value as is given by the gain of the buffer amplifier stage.

Figure 6:
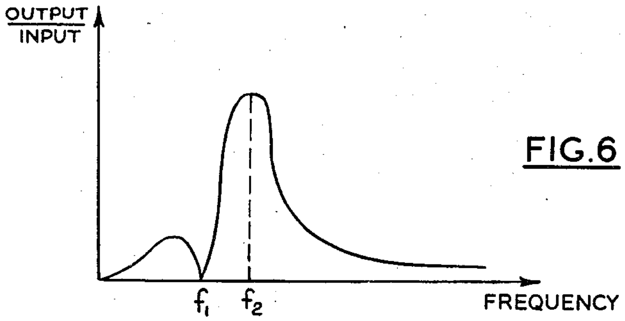
Figure 6 shows the frequency characteristic of the circuit of Figure 3 when the accepted frequency is higher than the rejected frequency.

Signals with such a response characteristic are fed into the amplifier circuit of Figure 2. This amplifier circuit acts in accordance with the curve of Figure 5 having a maximum gain at a frequency $f_2$. Thus the overall characteristic of the circuit of Figure 3, considering it from output terminal 30 to input terminal 29, is such as given by the curve in Figure 6. This is a combination of the two frequency characteristics shown in Figure 4 and Figure 5. At frequency $f_1$, nothing is passed through the twin-T circuit composed of elements 1 through 6. This is the specific characteristic of Figure 4. At frequency $f_2$, although the circuit of the twin-T composed of elements 1 through 6 does cut the signal down somewhat, nevertheless this is the point at which the amplifier system composed of elements 11 through 22 has the maximum gain. Thus the combination of these two systems provide the curve, such as that shown in Figure 6 in which there is no output signal at $f_1$ and there is a maximum output signal at frequency $f_2$.

Where it is desired that frequency $f_1$ and frequency $f_2$ be very close to each other, by proper design of the twin-T circuit 1—6 which appears between the two amplifier stages, it is possible to make the minimum point $f_1$ of the curve of Figures 4 and 6 reach zero and yet have frequency $f_2$ adjacent thereto strongly amplified because of the special frequency characteristic of the feedback amplifier circuit of Figure 2. From the above, it will now be clear that the circuit of Figure 3 has the unique characteristic of substantially eliminating one frequency and at the same time strongly amplify a frequency close to the frequency which was eliminated.

Figure 7:
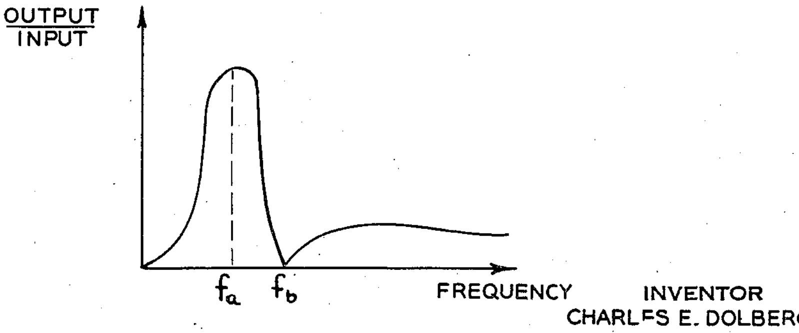
Figure 7 shows the frequency characteristic of the circuit of Figure 3 when the rejected frequency is higher than the accepted frequency.

If now the frequency of the twin-T circuits which appears between the two circuit amplifier tubes should happen to be higher than the frequency of the amplifiers using the regenerative feedback system, the overall curve would appear as is shown in Figure 7. Here it will be observed that the maximum response is obtained at the frequency $f_a$ which is the frequency of best response of the twin-T regenerative feedback amplifier. The zero response point occurs at frequency $f_b$ which now we can assign as the frequency at which no signal is transmitted through the twin-T network comprised of elements 1 through 6.

Figure 8:
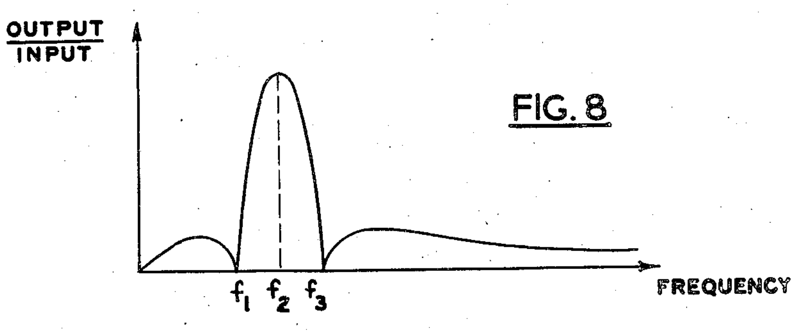
Figure 8 shows the frequency characteristic of a circuit employing two frequency rejecting systems, such as is shown in Figure 10.
Figure 10:
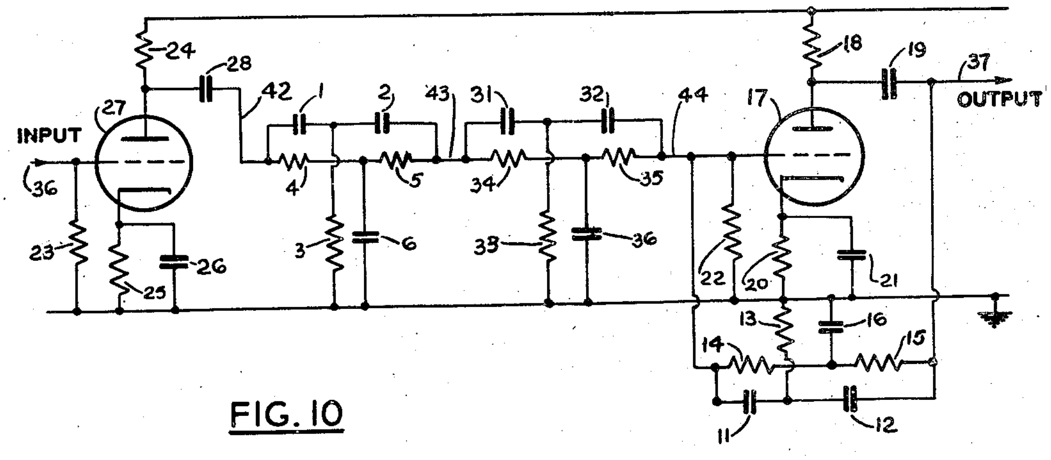
Figure 10 shows a system in which two frequencies are rejected, one on each side of the accepted frequency. Such a system has a frequency characteristic such as is shown in Figure 8.

Oftentimes it is highly desirable to pass only a narrow band of frequencies and to well exclude frequencies on both sides of the narrow band. Such a response characteristic is shown in Figure 8. This can be achieved with my invention by a modification of the circuit shown in Figure 3. This modification appears in Figure 10. A comparison of the two circuits will reveal that an additional twin-T network has been inserted between the two amplifying tubes. This network is composed of resistors 34, 35 and 33 and of capacitors 31, 32 and 36. In this network the signal at position 42 is substantially the same as the input signal except for low frequencies. The signal at position 43 has much the same characteristic as the signal in position 40 of Figure 3 in that at this position the frequency $f_1$ is completely eliminated. Consequently, there is no input at frequency $f_1$ to the second twin-T network comprising elements 31 to 36. The second twin-T network is adjusted for no transmission at a frequency $f_3$, and consequently at terminal 44 no component of frequency $f_3$ appears. Consequently then at terminal 44 both $f_1$ and $f_3$ are substantially eliminated. All other frequencies appear at these points in various magnitudes.

The feedback amplifier circuit which includes tube 17 has its twin-T network, comprised of elements 11 through 16, adjusted so that no feedback occurs at frequency $f_2$. However, of course, it amplifies no amount of $f_1$ or $f_3$ because there is no input to the amplifier stage itself at these two frequencies. Consequently, the output signal has the following characteristics. It contains no output of frequencies $f_1$ nor of $f_3$, and it contains the maximum at frequency $f_2$. This is essentially the characteristic of the band pass filter as was drawn in Figure 8.

Figure 9:
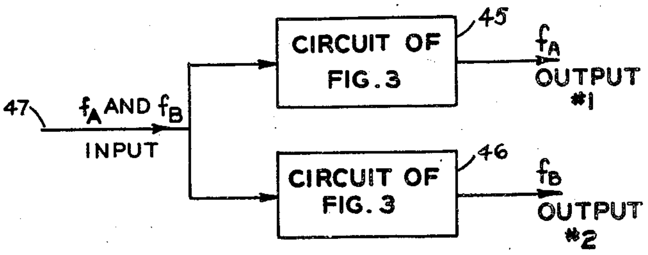
Figure 9 shows a system in which two frequencies can be separated one from another.

Another method of using the circuit of Figure 3 is shown in the block diagram of Figure 9. In this diagram, two complete units such as the circuit of Figure 3 are shown by two blocks 45 and 46. The input signal coming in at 47 is composed of two frequencies $f_a$ and $f_b$. This input signal is applied equally to both of the two circuits 45 and 46. Circuit 45 however has a characteristic somewhat like that of Figure 6, rejecting one frequency and accepting another. Let us assume that the frequency which this circuit accepts and amplifies the maximum amount is frequency $f_a$, and that the frequency which it completely rejects is frequency $f_b$. In the output of the circuit 45 will contain only frequency $f_a$. If now circuit 46 is so arranged that it accepts at a maximum amplification, frequency $f_b$ and completely rejects $f_a$, its output will be composed only of frequency $f_b$. Thus, the original proposition of separating frequencies $f_a$ and $f_b$ has been achieved by the use of these two circuits in combination.

It is, of course, possible using the type of system which we have described here to construct a frequency separation circuit so that several frequencies may be separated one from another. All that would be required would be a series of systems built around the circuit of Figure 3. Some of the circuits may have to be extended as I have extended the circuit of Figure 3 in order to obtain the circuit of Figure 10. However, using these means it would be possible to separate a series of audio frequencies one from another.

My invention then is the use of two well-known circuits in combination with each other to produce an effect which has been difficult to obtain heretofore; namely, the separation of audio frequencies which are spaced relatively close together. I am able with this combination of two circuits to separate audio frequencies which are only a few cycles apart.

Although my invention has been described above in terms of some specific combinations to obtain certain frequency curves, it should be understood that the basic principle of this type of combination can be varied considerably. Therefore, I prefer to have my invention described in terms of the following claims.

I claim:

1. An electric wave filter system comprising a first amplifier, a second amplifier, a first twin-T network connected between said amplifiers and a negative feed back circuit in said second amplifier comprising a second twin-T network, the frequency response characteristic of the first and second twin-T networks being such that the first network rejects frequencies close to the frequencies amplified in the second amplifier, the response of said amplifier being determined by said network in said feedback circuit.

2. In an electric wave filter system, a first twin-T network adjusted to eliminate one frequency, a second twin-T network in series with said first twin-T network adjusted to eliminate a second frequency different from the first frequency and an amplifier for amplifying frequencies between said first and second frequency.

3. In an electric wave filter system, a first twin-T network adjusted to eliminate one frequency, a second twin-T network in series with said first twin-T network adjusted to eliminate a second frequency different from the first frequency and an amplifier having a feed back circuit including a third twin-T network for preventing feed back of a frequency intermediate said first and second frequencies.

4. In an electric wave filter system, a first twin-T network adjusted to eliminate one frequency, a second twin-T network in series with said first twin-T network adjusted to eliminate a second frequency different from the first frequency and an amplifier having a negative feed back circuit including a twin-T network for preventing feed back of a frequency intermediate said first and second frequencies.

5. A vacuum tube circuit comprising at least a first vacuum tube amplifier and a second vacuum tube amplifier, coupling means extending between the anode of said first vacuum tube amplifier and the grid of said second vacuum tube amplifier, said coupling means including at least one twin-T network, a degenerative feed-back network extending between the anode of said second vacuum tube amplifier and the control grid of said second vacuum tube amplifier, said degenerative network including a twin-T network whose rejection frequency differs from the rejection frequency of said first twin-T network.

6. In an amplifier circuit, a first vacuum tube amplifier having a cathode, grid and anode, a second vacuum tube amplifier having a cathode, grid and anode, a twin-T coupling network extending between the anode of said first vacuum tube to the grid of said second vacuum tube having an output/input to frequency characteristic in which over a first predetermined frequency range the output/input ratio drops from approximately unity to zero at a predetermined frequency $f_1$, and above frequency $f_1$ the output/input ratio increases from zero to approximately unity, a twin-T coupling network extending between the anode of the second vacuum tube and the grid of the second vacuum tube having an output/input to frequency characteristic in which over a second predetermined frequency range beyond said predetermined frequency $f_1$, to a frequency $f_2$, the output/input ratio decreases from approximately unity to zero and above frequency $f_2$ the output/input ratio increases from zero to approximately unity.

7. In an amplifier circuit, a first vacuum tube amplifier having a cathode, grid and anode, a second vacuum tube amplifier having a cathode, grid and anode, two series connected twin-T coupling network extending between the anode of said first vacuum tube to the grid of said second vacuum tube, one of said twin-T networks having an output/input to frequency characteristic in which over a first predetermined frequency range the output/input ratio drops from approximately unity to zero at a predetermined frequency $f_1$, and above frequency $f_1$ the output/input ratio increases from zero to approximately unity, the other of said series connected twin-T networks being adjusted so that the ratio of output/input drops to zero at frequency $f_3$, a twin-T coupling network extending between the anode of the second vacuum tube and the grid of the second vacuum tube having an output/input to frequency characteristic in which over a second predetermined frequency range beyond said predetermined frequency $f_1$, to a frequency $f_2$, the output/input ratio decreases from approximately unity to zero and above frequency $f_2$ the output/input ratio increases from zero to approximately unity, to provide a narrow band-pass and to exclude frequencies immediately on both sides of said narrow band.

8. In an amplifier circuit, a first vacuum tube amplifier comprising a cathode, grid and anode, a second vacuum tube amplifier comprising a cathode, grid and anode, a first twin-T network, a second twin-T network, said first network extending between the anode of said first tube to the input of said second network, the output of said second network extending between the output of said first network to the grid of said second tube, a third twin-T network extending between the anode of said second tube to the grid of the second tube, the frequency characteristic of said first and second network being such that frequencies $f_1$ and $f_3$ are blocked, the frequency characteristic of the third network being such that frequency $f_2$ between $f_1$ and $f_3$ is blocked to provide no negative feedback at said frequency $f_2$.

CHARLES E. DOLBERG.

REFERENCES CITED

The following references are of record in the file of this patent:

UNITED STATES PATENTS

| Number | Name | Date |
|---|---|---|
| 2,167,079 | Landon | July 25, 1939 |
| 2,173,426 | Scott | Sept. 19, 1939 |
| 2,229,703 | Larsen | Jan. 28, 1941 |
| 2,245,365 | Riddle, Jr. | June 10, 1941 |
| 2,323,609 | Kihn | July 6, 1943 |
| 2,370,483 | Muffly | Feb. 27, 1945 |
| 2,383,984 | Oberweiser | Sept. 4, 1945 |